UNITED STATES PATENT OFFICE 2,137,208

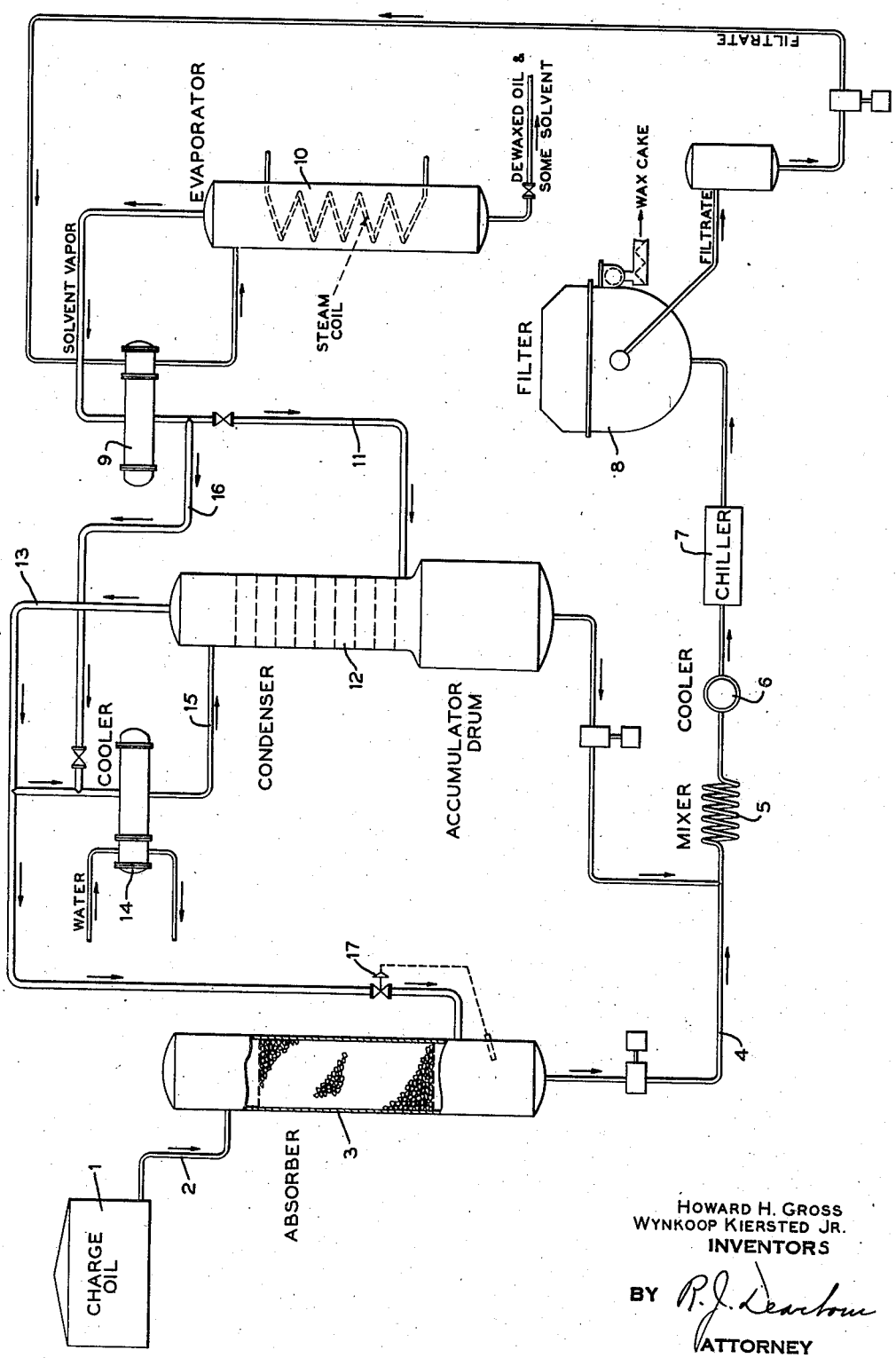

DEWAXING WAX-BEARING OIL

Howard H. Gross, Beacon, and Wynkoop Kiersted, Jr., Scarsdale, N. Y., assignors to The Texas Company, New York, N. Y., a corporation of Delaware Application October 28, 1936, Serial No. 107,924

2 Claims. (Cl. 196—18)

This invention relates to a method of dewaxing wax-bearing mineral oil.

The invention has to do with a process of solvent dewaxing hydrocarbon oil wherein the oil and solvent mixture is heated to an elevated temperature prior to chilling, thereafter chilled to precipitate the wax constituents, and the wax constituents so precipitated removed by filtration or other means.

Our invention contemplates removing the solvent from the resulting mixture of dewaxed oil and solvent liquid by vaporization, and bringing the solvent in the form of hot vapor and hot condensate into direct contact with fresh wax-bearing oil being charged to the plant. The wax-bearing oil absorbs the solvent vapors, and together with the hot condensed solvent forms a mixture of wax-bearing oil and solvent at a temperature substantially above the minimum temperature at which the wax and oil appear to be in complete solution.

It has been found advantageous in the dewaxing of wax-bearing mineral lubricating oil by filtration to heat the mixture of oil and solvent to an elevated temperature prior to chilling, and that by doing so higher rates of filtration are realized than when the mixture is not subjected to such heating prior to chilling. The increased rates of filtration are apparently due to the wax constituents of the oil having been precipitated in a more readily filterable and separable form when the mixture is heated to the proper temperature prior to chilling.

It appears that raising the temperature of the mixture to a sufficiently elevated point prior to chilling exerts a beneficial action where the oil contains a wax crystal modifying substance, either a naturally-occurring substance, or an artificial modifying substance such as Montan wax, aluminum stearate, etc.

For example, it has been found that when wax-bearing lubricating oil fractions having a Saybolt Universal viscosity of up to about 75 seconds at 210° F., in which has been incorporated a small amount of wax crystal modifying substance, are heated in the presence of the solvent to a temperature of around 130° to 170° F. prior to chilling, the wax constituents precipitated from such mixture upon chilling can be filtered therefrom at a rate of from about 6 to 24 gallons of wax-free oil per square foot of filtering surface per hour, as compared with a rate of about two to four gallons when the mixture is not subjected to such preliminary heating. It has been found that upon heating to temperatures above 170° F. prior to chilling, no further improvement in the filtration rate results. Likewise, upon heating to temperatures below about 130° F. prior to chilling, the change in the rate of filtration is not appreciable.

It has also been found that the relatively more viscous oils as, for example, those having a Saybolt Universal viscosity of about 80 seconds and above at 210° F. apparently contain naturally-occurring modifying substances, so that it is unnecessary to add an artificial modifying substance to such oils in order to realize increased rates of filtration by heating a mixture of such oil and dewaxing solvent to a temperature within the above specified critical range.

This critical range of heating temperature prior to chilling varies somewhat, depending upon the nature of the solvent used. For example, when using a solvent comprising pentane for dewaxing an oil of about 111 seconds Saybolt Universal viscosity at 210° F., the critical range of heating temperature is from about 150° to 190° F. With temperatures below 150° F., the change in rate is quite small, whereas with temperatures within the range 150° to 190° F., the rate of change is extremely rapid. Heating to temperatures above 165° F. prior to chilling, causes the rate to fall off so that where the mixture is heated to a temperature of about 190° F. and then chilled, the filtration rate realized is substantially the same as that realized when the mixture is heated to a temperature of about 150° F. prior to chilling.

Accordingly, our invention involves dewaxing by a method in which the mixture of wax-bearing oil and solvent is heated to an elevated temperature prior to chilling, and particularly concerns a method of utilizing the sensible and latent heat of vaporization contained in the solvent vapors recovered from the dewaxed oil for supplying the necessary heat with which to raise the temperature of the wax-bearing oil to the desired temperature prior to chilling.

The process of our invention offers a number of advantages. It utilizes the heat content contained in the solvent vaporized from the dewaxed mixture of oil and solvent, and thus avoids the necessity for employing a large source of auxiliary heat.

An advantage resides in avoiding the necessity for subjecting the solvent vapor from the solvent recovery still to sub-cooling, or cooling to relatively low temperatures. Where the vaporized solvent is condensed by indirect heat exchange with a cooling medium, it is necessary to maintain relatively low temperatures in the cooling and condensing apparatus due to the volatile nature of the solvents customarily employed in dewaxing.

For example, in dewaxing wax-bearing oil with a solvent, such as a mixture of methyl ethyl ketone and benzol, it is customary to remove the solvent from the mixture of dewaxed oil and solvent by vaporization, and the vaporized solvent is subjected to condensation and cooling by indirect heat exchange contact with suitable cooling media. In such case, it is necessary to maintain a temperature of around 140° F. or below in the condensing and cooling apparatus. If the temperature is allowed to rise above this point, a substantial amount of the solvent will not be condensed due to its volatility. However, by effecting the condensation of the solvent in accordance with the procedure of our invention, it is sufficient to maintain a temperature of around 170° F., for example, in the condensing and cooling apparatus. It is, of course, realized that the temperature will depend, in each case, upon the particular solvent used, as well as upon the conditions of pressure maintained in the system.

Furthermore, since it is not necessary to maintain as low temperatures as heretofore, less cooling and condensing surface is required.

The method of our invention will now be more fully described by reference to the accompanying drawing.

As shown in the drawing, the wax-bearing oil to be dewaxed is conducted from a storage tank 1 through a pipe 2 to an absorber 3. The absorber advantageously comprises a cylindrical tower provided with suitable packing material as indicated, such as Raschig rings, for example. The wax-bearing oil is introduced to the upper portion of the absorber and distributed over the top of the packing material. As it descends through the packing material, it comes into direct contact with solvent vapor which is being introduced to the lower portion of the absorber at a point below the packing material. The source of the solvent vapor will be described later.

As the oil passes downwardly through the absorber 3, it absorbs the hot solvent vapor and the warm mixture is continually withdrawn from the bottom of the absorber through a pipe 4. Through the pipe 4, the warm mixture is conducted to a turbulence coil or mixer 5 wherein it is mixed with hot solvent liquid condensed at a subsequent point in the system, as will be more fully described, and the resulting mixture, at the desired elevated temperature to thereby condition it for dewaxing, is then conducted through a cooler 6 and chiller 7. The cooling medium in the cooler 6 may be water, while that in the chiller 7 is cold brine.

In the chiller 7, the mixture of wax-bearing oil and solvent is chilled to any desired temperature, as, for example, temperatures of around 0° F. and below, in order to precipitate the wax constituents.

From the chiller 7, the cold mixture is conducted to a filter 8, advantageously of the Vallez type, wherein the precipitated wax is removed from the cold mixture in the form of a wax cake which is withdrawn in the usual manner.

The dewaxed filtrate is removed from the filter and conducted by a pump through an exchanger 9 to an evaporator 10 wherein substantially all of the solvent is vaporized from the dewaxed oil. The vaporization is brought about by heat supplied to the evaporator through an indirect heating coil as indicated. Steam may be passed through the coil to supply the heat.

The unvaporized liquid comprising dewaxed oil is withdrawn from the bottom of the evaporator 10 and conducted to a steam still not shown for the purpose of removing any remaining solvent from the oil.

The solvent vapor formed in the evaporator 10 is removed therefrom and conducted through the exchanger 9, wherein it is subjected to partial condensation. The uncondensed hot vapor together with the condensate is conducted from the exchanger 9 through a pipe 11 to the middle portion of a vessel 12.

The upper portion of the vessel 12 is provided with trays or packing material as shown, and is adapted to provide a partial condenser for the solvent vapor. The solvent vapor rises upwardly through the trays or packing material, and in so doing is brought into direct contact with a reflux condensate being returned to the top of the vessel 12, as will be explained.

The uncondensed vapor is withdrawn from the top of the vessel 12 through a pipe 13. A portion of this vapor is introduced to the lower portion of the absorber 3, previously referred to, while a portion of it is introduced to an exchanger 14 wherein it is brought into indirect contact with a cooling medium, such as water. Condensation of the vapor entering the exchanger 14 is thus brought about to thereby supply reflux condensate which is returned through a pipe 15 to the upper portion of the vessel 12.

The amount of condensation occurring in the exchanger 14 is regulated so as to provide sufficient reflux cooling to furnish the necessary amount of condensation of solvent vapor in the upper portion of the vessel 12.

If desired, some of the solvent vapor leaving the exchanger 9 may be introduced directly to the exchanger 14 through a pipe 16 instead of being introduced to the lower portion of the vessel 12.

The condensate formed in the vessel 12 accumulates in the lower portion thereof. Conditions are maintained within the vessel 12 so that the condensate accumulating in the lower portion thereof will be at a temperature of around 165° or 170° F. This hot condensate is withdrawn therefrom and introduced to the mixer 5 to which reference has previously been made, and wherein it is mixed with the wax-bearing oil and solvent liquid leaving the absorber 3.

As already mentioned, that portion of the solvent vapor not condensed in the vessel 12 and the exchanger 14 is introduced to the lower portion of the absorber 3 wherein it is absorbed by the fresh charge oil entering the system. The mixture of the oil and absorbed solvent accumulates in the bottom of the absorber 3 at a temperature of around 165° F. By means of an automatic temperature control valve, the amount of solvent vapor entering the lower portion of the absorber 3 is regulated so that a constant temperature is maintained, and all of the solvent so introduced is absorbed by the oil. Since the wax-bearing oil entering the top of the absorber 3 is at a relatively low temperature, namely, around 125° to 140° F., the temperature prevailing within the top of the absorber 3 is thus well below the point at which the solvent would escape in vapor form.

When dewaxing wax-bearing oil with a selective solvent, such as a mixture of about 30% to 40% methyl ethyl ketone and 70% to 60% benzol, it is desirable to heat the mixture of oil and solvent to a temperature of around 165° or 170° F. prior to chilling. The proportion of solvent mixture to wax-bearing oil necessary for effecting the dewaxing step may vary from about two to four parts of solvent mixture to one part of oil.

The solvent mixture of methyl ethyl ketone and benzol boils at a temperature in the range 175° to 180° F. Accordingly, it is contemplated subjecting the solvent vapor to partial condensation in the vessel 12 at a temperature of around 165° F. The resulting condensate will then be at this temperature, and thus at the proper temperature for mixing with the preheated wax-bearing oil in the mixer 5. As a result, the total mixture of wax-bearing oil and solvent liquid in the mixer 5 will be at a sufficiently elevated temperature to properly condition the mixture prior to chilling.

In the operation of the process, it is contemplated maintaining conditions of temperature and pressure in the system such that about 30% of the solvent vapor will be condensed in the exchanger 9, about 60% in the vessel 12, and the remainder, or about 10%, in the absorber 3. The latent heat of vaporization in about 10% of the hot solvent vapor is necessary to effect preliminary heating of the entering charge oil to a temperature of around 165° F.

From the foregoing, it will be seen that when dewaxing with a solvent mixture consisting of methyl ethyl ketone and benzol, the lowest temperature maintained within the condensing system is a temperature of around 165° F. This is to be contrasted with the conventional method of operation wherein it is necessary to maintain substantially lower temperatures, namely, around 140° F.

Obviously, many modifications and variations of the invention, as hereinbefore set forth, may be made without departing from the spirit and scope thereof, and therefore only such limitations should be imposed as are indicated in the appended claims.

We claim:

1. In the process of dewaxing wax-bearing lubricating oil wherein about one volume of oil is mixed with three to four volumes of a solvent consisting of about 40% methyl ethyl ketone and 60% benzol, the mixture heated to a temperature of around 160 to 170° F. to condition it, then chilled and filtered to remove the precipitated wax and produce a dewaxed solution of oil and solvent, the steps comprising vaporizing the solvent liquid from the dewaxed solution, condensing, without substantial reduction in temperature, a major portion of said vaporized solvent to form hot condensate at a temperature of around 165° F., absorbing the uncondensed portion of said solvent vapor in the fresh wax-bearing charge to form a mixture at about 165° F., and mixing the charge containing absorbed solvent with the aforesaid hot condensate, thereby producing a final mixture of wax-bearing oil and solvent at substantially the conditioning temperature required prior to chilling.

2. In the process of dewaxing wax-bearing lubricating oil wherein about one volume of oil is mixed with three to four volumes of a solvent consisting of about 40% methyl ethyl ketone and 60% benzol, the mixture heated to a temperature of around 160 to 170° F. to condition it, then chilled and filtered to remove the precipitated wax and produce a dewaxed solution of oil and solvent, the steps comprising vaporizing the solvent liquid from the dewaxed solution, absorbing in the fresh wax-bearing oil charge a minor proportion of said solvent vapor sufficient only to heat the oil to a temperature of about 165° F., introducing the main body of unabsorbed solvent vapor to the lower portion of a reflux condenser, introducing cooled solvent condensate as a reflux to the upper portion of said condenser, subjecting the main body of solvent vapor to condensation within said reflux condenser without substantial reduction in temperature, thereby forming solvent condensate at a temperature of around 165° F. and mixing said hot condensate with the fresh charge containing absorbed solvent, thereby producing a final mixture of wax-bearing oil and solvent at substantially the conditioning temperature required prior to chilling.

HOWARD H. GROSS.
WYNKOOP KIERSTED, Jr.